United States Patent [19]
Kusano

[11] Patent Number: 5,982,743
[45] Date of Patent: Nov. 9, 1999

[54] PERFORMANCE MONITOR SYSTEM, TRANSMISSION DEVICE AND PERFORMANCE MONITOR METHOD OF TRANSMISSION LINE

[75] Inventor: Toshihiko Kusano, Tokyo, Japan

[73] Assignee: NEC Corporation, Tokyo, Japan

[21] Appl. No.: 08/802,044

[22] Filed: Feb. 18, 1997

[30] Foreign Application Priority Data

Feb. 15, 1996 [JP] Japan .................................. 8-027793

[51] Int. Cl.⁶ .............................. H04J 3/14; H04L 12/26
[52] U.S. Cl. ........................ 370/217; 370/231; 370/236; 370/244; 370/248
[58] Field of Search .................................. 370/216, 217, 370/218, 221, 222, 242, 244, 248, 249, 250, 389, 400, 401, 230, 23.1, 235, 236; 340/825.03, 826, 827; 714/1, 2, 3, 4

[56] References Cited

U.S. PATENT DOCUMENTS

| | | | |
|---|---|---|---|
| 4,330,885 | 5/1982 | Abott et al. | 370/217 |
| 4,390,984 | 6/1983 | Sugiura et al. | 370/248 |
| 4,546,467 | 10/1985 | Yamamoto | 370/245 |
| 4,799,215 | 1/1989 | Suzuki | 370/231 |
| 5,142,526 | 8/1992 | Moriue et al. | 370/245 |
| 5,457,687 | 10/1995 | Newman | 370/232 |
| 5,477,536 | 12/1995 | Picard | 370/400 |
| 5,689,546 | 11/1997 | Sheets et al. | 370/242 |
| 5,706,280 | 1/1998 | Kosugi et al. | 370/244 |
| 5,793,976 | 8/1998 | Chen et al. | 370/351 |

FOREIGN PATENT DOCUMENTS

| | | |
|---|---|---|
| 59-167161 | 9/1984 | Japan . |
| 62-163433 | 7/1987 | Japan . |
| 62-245827 | 10/1987 | Japan . |
| 4-304046 | 10/1992 | Japan . |

Primary Examiner—Alpus H. Hsu
Attorney, Agent, or Firm—Young & Thompson

[57] ABSTRACT

The present invention is a transmission system with a performance monitor function. The system has an end office, an opposite office located opposite the end office and an intermediate office located between the end office and the opposite office. In the transmission system each of the end office, the opposite office and the intermediate office has a transmitter/receiver for transmitting/receiving information and a performance monitor for monitoring performance of a transmission line. The intermediate office has a switch for switching lines and a bypass for bypassing the switch and for transmitting/receiving a signal to/from an adjacent office while the performance monitor is operating.

19 Claims, 6 Drawing Sheets

PERFORMANCE MONITOR SYSTEM, TRANSMISSION DEVICE AND PERFORMANCE MONITOR METHOD OF TRANSMISSION LINE

BACKGROUND OF TEE INVENTION

This invention relates to a monitor for a digital transmission line. More specifically, this invention relates to a transmission device which includes the function of monitoring the performance of the transmission line in a transmission system wherein two or more transmission devices are connected via lines. The transmission device may include two or more end offices and two or more intermediate exchanges located between the end offices and perform the function of monitoring the performance of each exchange or cross-connect system, for example, from one end office.

The conventional performance monitor function for measuring data errors in a transmission line during digital transmission is disclosed in JP-A-245827/1987 and JP-A-167161/1984, wherein the performance monitor function is implemented by inserting a performance monitor signal (which includes a CRC value and the like based on a transmission signal from the transmitting end) in monitors that are between transmission devices or switching devices located in the transmission line. The performance monitor signal is extracted on the transmitting end, and the operation value such as the CRC value from the transmission signal and the CRC value of the performance monitor signal received are compared in order to detect errors. Moreover, the performance monitor is independently implemented in monitors existing in the end-to-end monitor section.

In addition, a method of monitoring a combination of arbitrary contiguous units in the monitor section is disclosed in JP-A-163433/1987.

A method checking the result is disclosed in JP-A-245827/1987 and JA-A-167161/1984, wherein the monitor of the result is implemented on the monitor signal transmitting end by inserting the response into a backward signal. Moreover, a performance measurement method is disclosed in JP-A-304046/1992, wherein the performance monitor signal transmitted from the start point to another point is directly returned to the start point and the performance measurement is implemented on the start point. In JP-A-163433/1987, the transmission device which implements the performance monitor by transferring only error occurrence pulses to the centralized monitor station in order to perform centralized error count is disclosed.

The end-to-end communication section of this kind comprises two or more switching devices and the performance monitor supposes the status where lines are connected with these connection devices. When the end-to-end quality of unconnected lines planned to be in service is checked in advance, the conventional transmission device with the performance monitor function implements the performance monitor for every discontiguous monitor section and decides whether the required performance is met based on the performance checking result.

The above-mentioned conventional transmission device with the performance monitor function requires that the performance monitor is implemented in the status where all lines for which the performance monitor is implemented are connected. It is supposed for the unconnected lines planned to be in service that when the end-to-end quality of unconnected lines planned to be connected is checked in advance, the performance monitor is implemented for each monitor section divided by the connection device and checks whether any performance fault has been occurred based on the result. Therefore, it is required in order to obtain the performance checking result in advance that the performance monitor is implemented for each monitor section and the performance checking results for each monitor section are collected and edited to provide performance information among the end-to-end sections.

SUMMARY OF THE INVENTION

It is an object of the present invention to provide a novel transmission device with a performance monitoring function which readily and fully monitors the performance of unconnected lines as well as lines connected between transmission devices.

The transmission device with the performance monitor function of the present invention may comprise an end office transmitter-receiver, an opposite exchange transmitter-receiver located on the opposite side of the end office transmitter-receiver and an intermediate exchange located between the end office transmitter-receiver and the opposite exchange transmitter-receiver.

It is a further object of the present invention to remove the above-mentioned faults in the conventional device. To this end, the transmission device with the performance monitor function of this invention comprises the performance monitor devices in the end office transmitter-receiver. the opposite exchange transmitter-receiver and the intermediate exchange transmitter-receiver The intermediate exchange comprises bypassing means for bypassing the line connection section therein and transmits/receives a signal to/from the adjacent transmitter-receiver while the performance monitor device is operating.

More concretely, the transmission device with the performance monitor function of this invention comprises the end office transmitter-receiver for monitoring performance, the opposite exchange transmitter-receiver located on the opposite side of the end office transmitter-receiver part and the intermediate exchange transmitter-receiver located between the end office transmitter-receiver part and the opposite exchange transmitter-receiver part and comprising the line connection section for line connection. Moreover, the end office transmitter-receiver comprises the performance measurement signal transmission section wherein the forward path performance monitor information including the performance monitor information and the forward route information is inserted in the forward path transmission data and transmitted to the above-mentioned adjacent intermediate exchange transmitter-receiver. The intermediate exchange transmitter-receiver comprises the forward path performance checking result transmission section wherein the performance is measured for each performance monitor section based on the forward path performance monitor information and the performance checking result is inserted into the forward path transmission data and the forward path monitor information extract section wherein the forward path performance monitor route information and the performance checking result from the adjacent transmitter-receiver is received. The opposite exchange transmitter-receiver comprises the performance checking result transmission section wherein the backward path performance checking result information including the forward path performance monitor information and the backward route information from the adjacent intermediate exchange transmitter-receiver is inserted into the backward transmission data and transmitted to the adjacent intermediate exchange transmitter-receiver. The intermediate exchange transmitter-receiver further comprises the backward path performance checking result transmission section wherein the backward path performance checking result information is inserted into the backward path transmission data and the backward path monitor information extract section wherein the backward path performance monitor information and the performance checking result from the adjacent transmitter-receiver is received. The line connection section is located between the forward path monitor information extract section and the forward path performance checking result transmission section and between the backward path monitor information extract section and the backward path performance checking result transmission section. Furthermore, the forward path connection means for bypassing the line connection section and connecting the forward path monitor information extract section and the forward path performance checking result transmission section and the backward path connection means for bypassing the line connection section and connecting the backward path performance monitor information extract section and the backward path performance checking result transmission section are provided.

As one of the actual performance monitors, the forward path performance checking result transmission section and the backward path performance checking result transmission section of this invention include the error rate detection means so that the performance is measured by detecting the error rate. In addition, the forward path performance checking result transmission section and the backward path performance checking result transmission section may apply the transmission line evaluation means for measuring the loss of the transmission line connecting transmitter-receivers.

Moreover, for example in an embodiment of the above-mentioned connection means, the forward path monitor information path information extract section comprises the forward path bypassing means for transmitting the forward path performance monitor information and the forward path performance checking result to the forward path performance checking result transmission section via the forward path connection means. In addition, the forward path bypassing means is provided as the switch for switching the connections of the line connection section and the forward path connection means. The same system may also be applied to the backward path monitor information path information extract section.

The transmission device with the performance monitor function of this invention comprises the system wherein the performance monitor for each transmitting/receiving station is sequentially implemented based on the path information included in the forward path performance measurement signal and the performance measurement data is added to the same backward path performance measurement signal. Therefore, the line connection section implements the performance monitor regardless of whether the line connection section is actually connected via a line.

BRIEF DESCRIPTION OF THE DRAWINGS

These and other objects, features and advantages of the present invention will become more apparent upon a reading of the following detailed description and drawings, in which.

DESCRIPTION OF THE PREFERRED EMBODIMENTS

Figure 1:
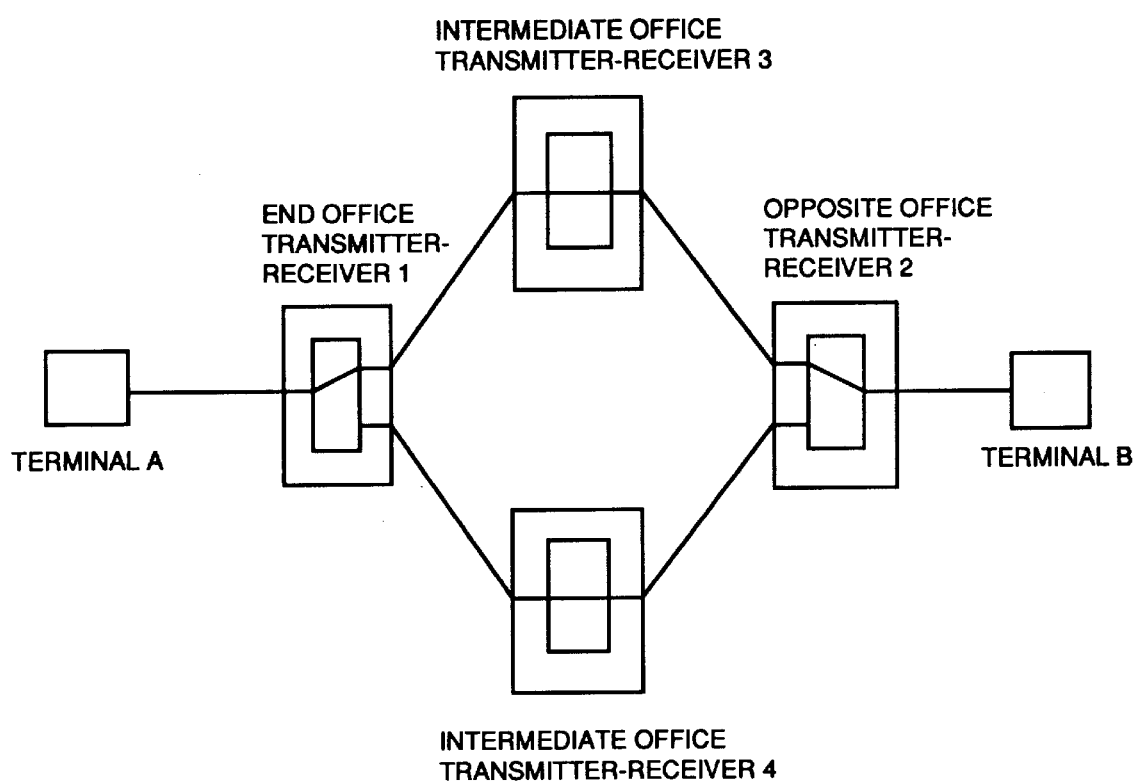
FIG. 1 is a drawing showing the configuration of the whole transmission device to which the transmission device with the performance monitor function of this invention is applied.

The transmission device with the performance monitor function of the present invention is explained in detail, referring to the drawings.

FIG. 1 is a schematic drawing of the whole transmission device with the performance monitor function of the present invention. The simplest configuration is shown here to be readily understood. The transmission device comprises the end office transmitter-receiver 1 connected to the terminal A, the opposite exchange transmitter-receiver 2 located on the opposite side of the end office transmitter-receiver 1 and connected to the terminal B, and the intermediate exchanges 3 and 4 located between the devices 1 and 2. The configuration of the transmission device here shows that the end office transmitter-receiver 1 transmits/receives a signal to/from the opposite exchange transmitter-receiver 2 via the path of the intermediate exchange transmitter-receiver 3 or 4.

Figure 2:
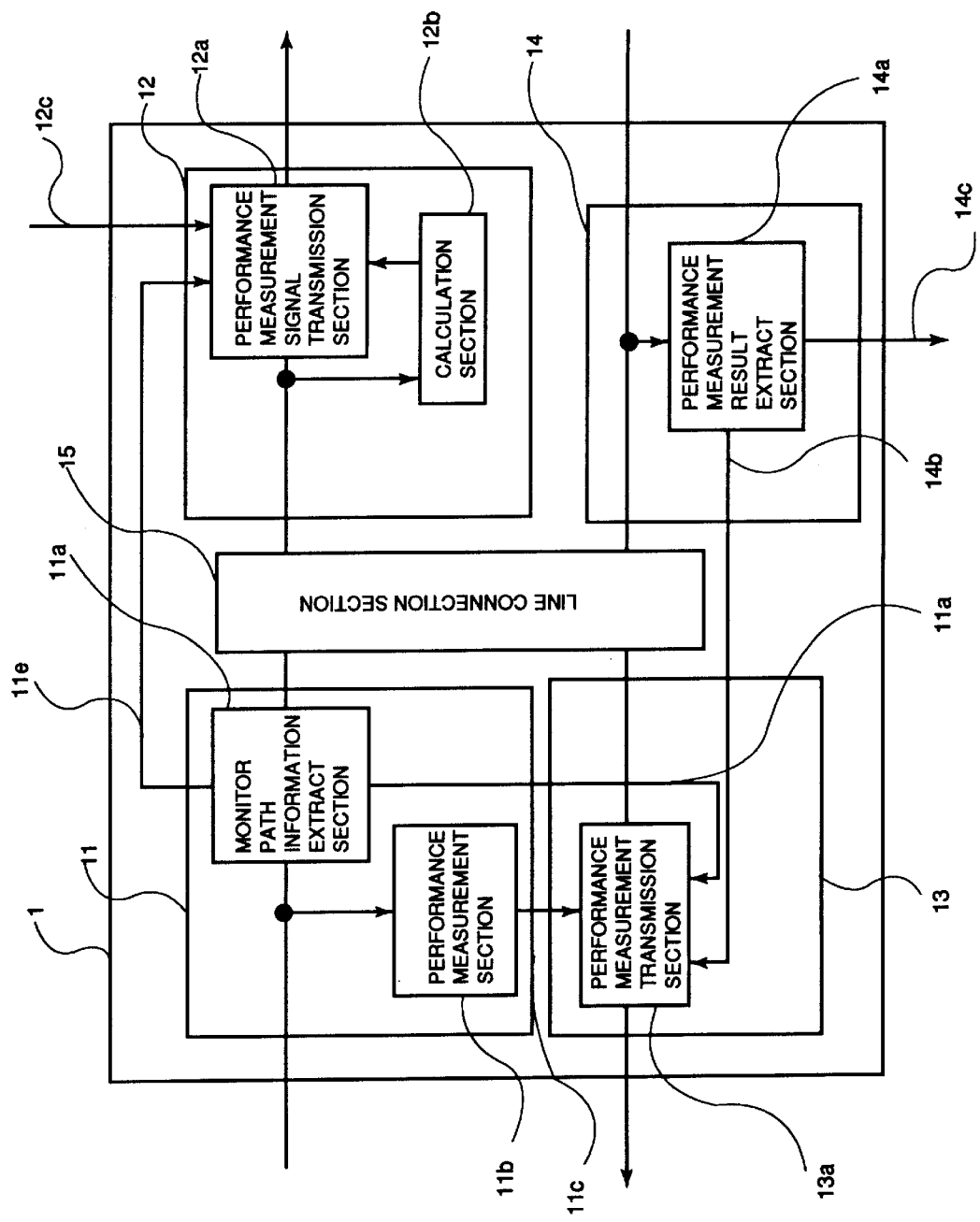
FIG. 2 is a drawing showing the configuration of an embodiment of the transmission device with the performance monitor function of this invention.

FIG. 2 is the configuration of the inside of the transmitter-receiver used as the transmission device with the performance monitor function of this invention, that is, the configuration of the inside of each transmitter-receiver 1 to 4 in FIG. 1.

Figure 3:
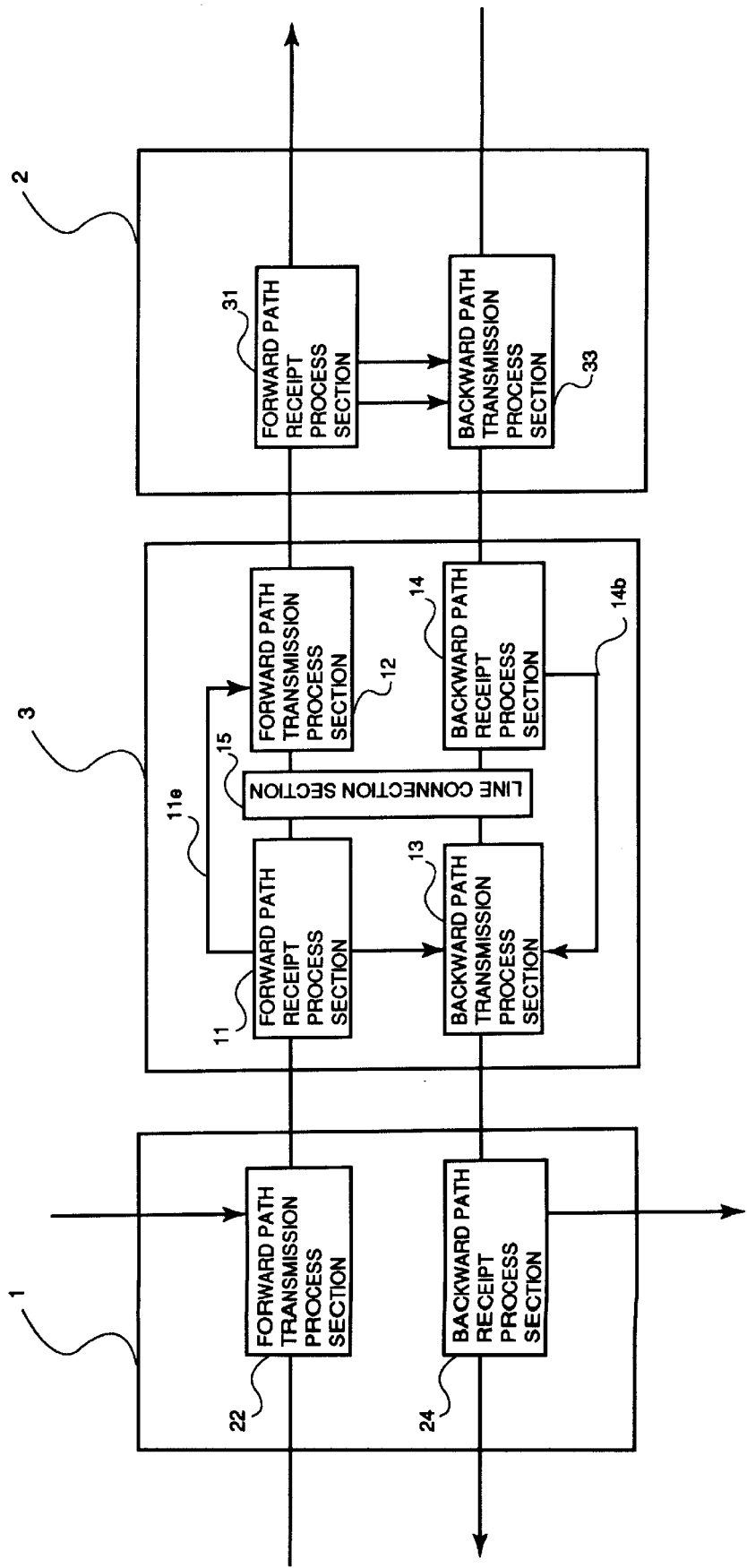
FIG. 3 is a drawing showing the configuration of an embodiment of the transmission device with the performance monitor function of this invention.

FIG. 3 is the configuration of an embodiment of the transmission device with the performance monitor function of this invention. The configuration wherein the end office transmitter-receiver 1 and the opposite exchange transmitter-receiver 2 are connected via the intermediate exchange transmitter-receiver 3 in FIG. 1 is shown here. The transmitter-receiver in FIG. 2 may be applied to the end office transmitter-receiver 1 and the intermediate exchange transmitter-receivers 3 and 4 in FIG. 3.

Figure 4:
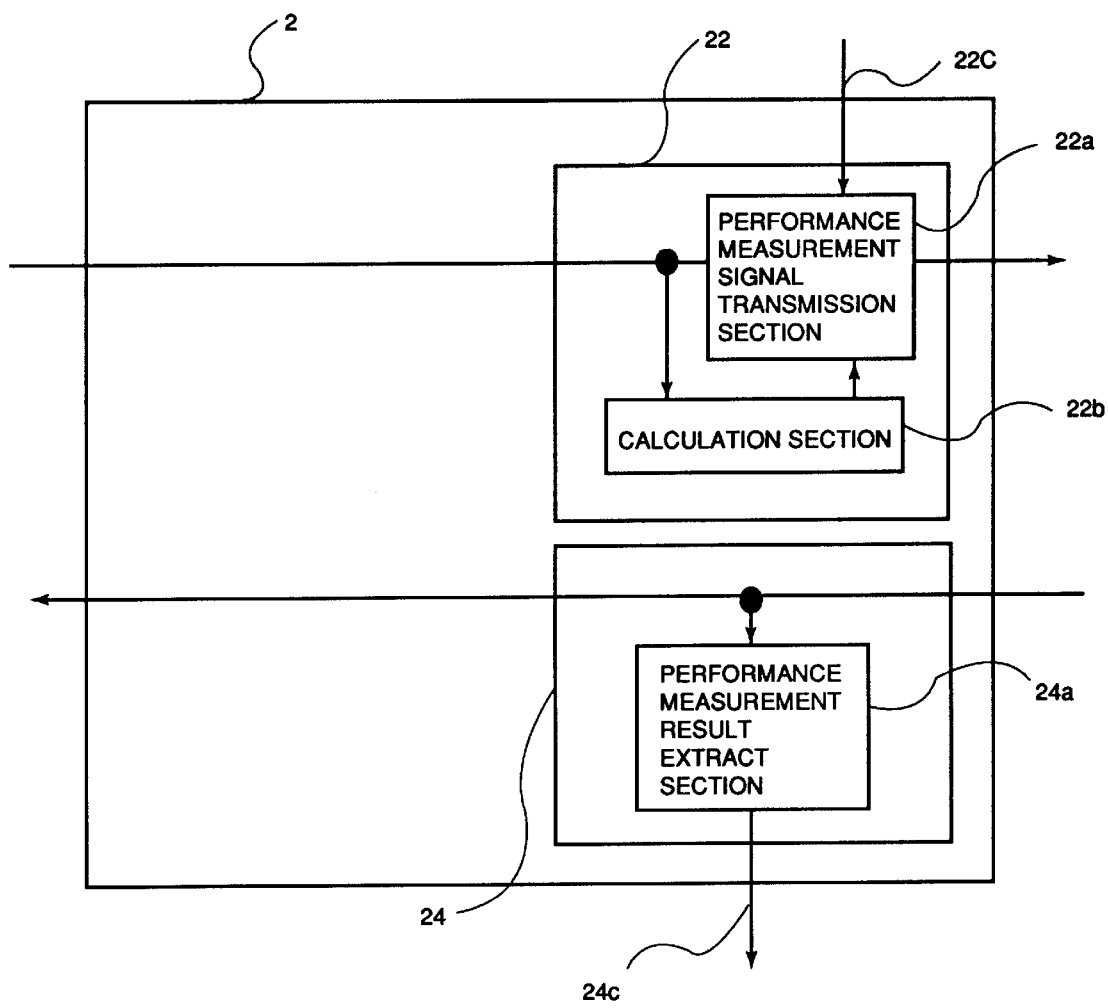
FIG. 4. is a drawing showing the configuration of the end office on the transmitting end in an embodiment of the transmission device with the performance monitor function of this invention.

FIG. 4 is the configuration of the transmitter-receiver comprising only the functions required for an end office on the transmitting end in order to explain the transmitter-receivers 1 and 2 in FIG. 1.

Figure 5:
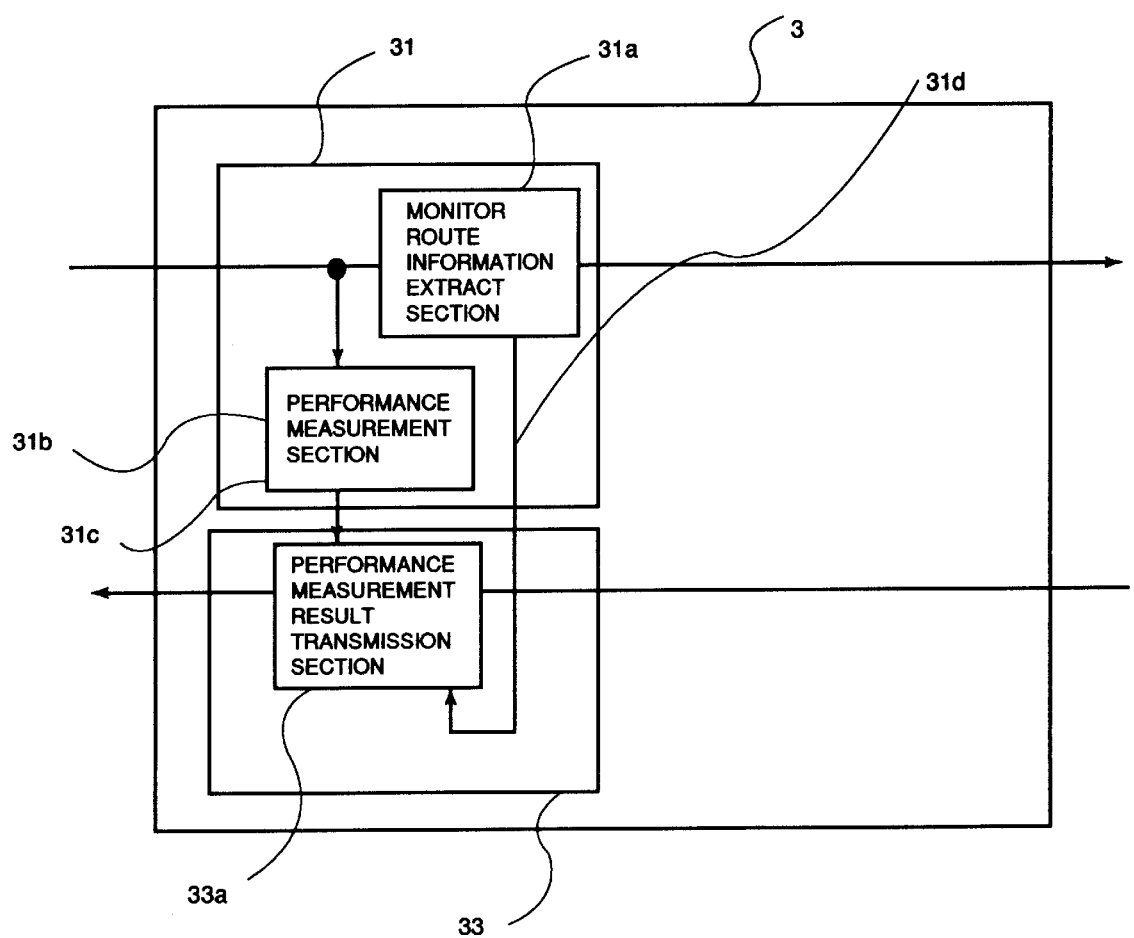
FIG. 5 is a drawing showing the configuration of the end office on the receiving end in an embodiment of the transmission device with the performance monitor function of this invention.

FIG. 5 is also the configuration of the transmitter-receiver comprising only the functions required for an end office on the receiving end. The operation of the end office transmitter/receiver 1 is explained, referring to FIG. 2. In addition, the device names in FIGS. 2, 4 and 5 are also used in FIG. 3.

When starting the performance monitor, a performance monitor starter sets the control information for the performance monitor signal transmission section 22a of the end office transmitter-receiver 1. The control information, for example, may include the performance monitor route information such as the end office transmitter-receiver 1 through the intermediate exchange transmitter-receiver 3 through the opposite exchange transmitter-receiver 2 as explained above via the performance monitor control line 22c. In the performance monitor signal transmission section 22a, the performance monitor signal comprising the performance monitor route information generated based on the set information and the performance checking signal calculated by operating in the operation section 22b an error-detecting signal, for example, with the CRC, is inserted into the transmission data. The signal into which the above-mentioned information has been inserted into is transmitted from the end office transmitter-receiver 1 to the adjacent intermediate exchange transmitter-receiver 3.

Figure 6:
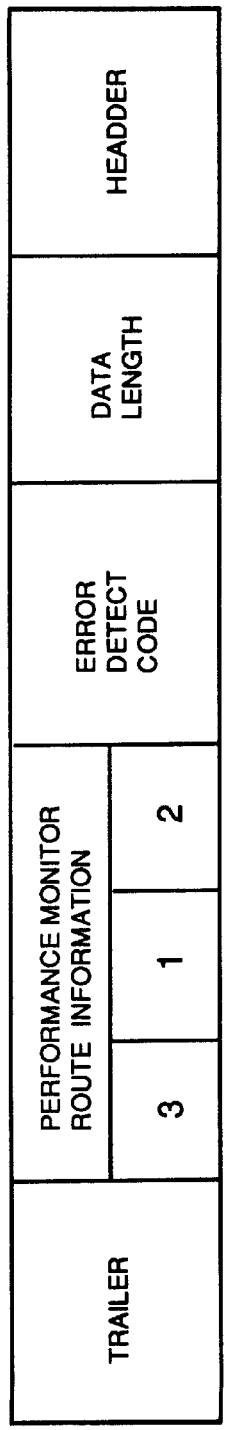
FIG. 6 is a drawing showing an example of the performance monitor signal used in an embodiment of the transmission device with the performance monitor function of this invention.

In FIG. 6, an embodiment of a performance monitor signal is shown as information of the packet type. Actually, the transmission type of the performance monitor signal such as a blank data field appearing in a fixed cycle in an ATM cell and an STM(Synchronous Transfer Mode) is decided based on the transfer mode. However, a performance monitor signal shown in an embodiment of the transmission device with the performance monitor function of this invention may be transferred regardless of which mode is specified.

In FIG. 2, the operation of the intermediate exchange transmitter-receiver 3 which has received the signal from the above-mentioned end office transmitter-receiver 1 is explained. In the intermediate exchange transmitter-receiver 3, the data received is input to the performance checking section 11b and the error calculation value for the received data and the extract value of the error-detecting code of the performance monitor signal previously inserted are compared, whereby the performance checking result of the self-section is calculated. The performance checking result is then input to the performance checking result transmission section 13a.

In the monitor route information extract section 11a, the monitor route information is extracted from the data and the output port to be monitored next is identified, then posted to the performance monitor route information transmission section 12a via the monitor route information transfer line 11e and instead into the transmission data. Here, the information required for the adjacent intermediate exchange transmitter-receiver may be transmitted other than via the line connection section 15. That is, the monitor route and the line connection status of the line connection section 15 at this point are not related. Similarly, the error-detecting code is calculated and inserted, then the signal is transmitted from the intermediate exchange transmitter-receiver 3. In addition, when, for example, the monitor route information extract section 11a has received the performance monitor signal and the like, switching to the transfer line lie may automatically be implemented by the switch set in the inside.

The signal transmitted from the above-mentioned intermediate exchange transmitter-receiver 3 is received by the opposite exchange transmitter-receiver 2. The opposite exchange transmitter-receiver 2 is the end of the performance monitor sections of this embodiment. In the opposite exchange transmitter-receiver 2, an error in the received data is also calculated in order to obtain the performance result. The checking result is transmitted to the performance checking result transmission section 33a via the result transfer line 31c. Referring to the monitor route information detected in the monitor route information extract section 31a explains that the opposite exchange transmitter-receiver 2 is the end of the performance monitor sections as the previous control information reads. After recognizing the end point, the monitor route information extract section 31a outputs the path information to the performance checking result transmission section 33a via the path information transfer line 31d.

In the performance checking result transmission section 33a, the backward route information wherein the start and end points in the path information input are reversed is generated, and the performance checking result information is generated and output to the transmission device 1 as well as the previous performance measurement result.

Figure 7:
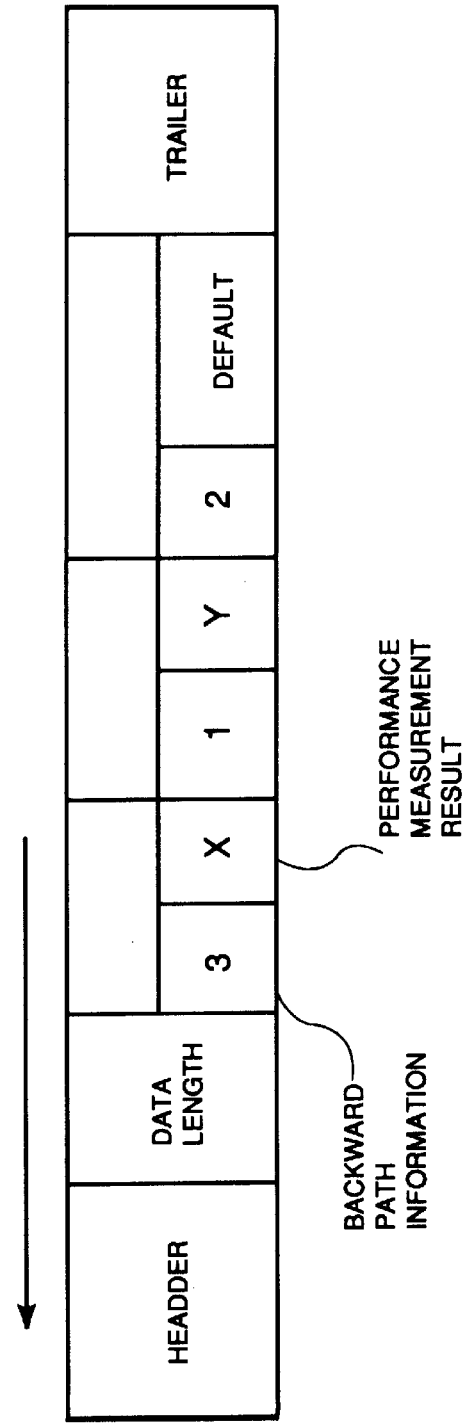
FIG. 7 is a drawing showing an example of the performance monitor result used in an embodiment of the transmission device with the performance monitor function of this invention.

FIG. 7 is an embodiment of the performance monitor signal. This embodiment shows which checking result is calculated for which section by indicating the performance checking result corresponding to the backward route information. Another indication method may be taken by integrating transmitting/receiving operations.

In the intermediate exchange transmitter-receiver 3, the performance checking result information extract section 14a in FIG. 2 extracts the performance checking result information and the backward route information from the input data. The backward path output port though which the performance checking result information is transferred is identified based on the backward route information extracted and output to the performance checking result transmission section 13a via the checking result transfer line 14b. In the performance checking result transmission section 13a, the performance checking result information to which the performance checking result previously input from the performance measurement section 11b has been added is generated for the performance checking result information input and transmitted to the end office transmitter-receiver 1.

In the end office transmitter-receiver 1, like the intermediate exchange transmitter-receiver 3, the performance checking result is extracted from the input data. Here, like the opposite exchange transmitter-receiver 2 in the forward path, the end office transmitter-receiver 1 is recognized as the end of the backward route based on the backward route information extracted. As a result, it is decided that further transferring the performance information is not required and the performance checking result is transmitted to the performance monitor starter via the checking result response control line 14c.

The performance monitor starter may know the performance checking result of the unconnected line to be in service based on the performance checking result obtained as described above and may decide whether the line is in service before connecting the line.

That is, in FIG. 1, only the path among the end office transmitter-receiver 1, the intermediate exchange transmitter-receiver 3 and the opposite exchange transmitter-receiver 2 is in service. The service, for example, wherein the terminal A, the end office transmitter-receiver 1, the intermediate exchange transmitter-receiver 3, the opposite exchange transmitter-receiver 2 and the terminal B have been connected is provided between the terminal A. connected to the end office transmitter-receiver 1 and the terminal B connected to the opposite exchange transmitter-receiver 2.

The same service as one provided by the connected path may be provided for the terminals A and B by the unconnected path among the end office transmitter-receiver 1, the intermediate exchange transmitter-receiver 4 and the opposite exchange transmitter-receiver 2 (the path below in FIG. 1), in addition, may be used as a spare for the path via the intermediate exchange transmitter-receiver 4. The transmission device with the performance monitor function of this invention checks whether the unconnected section has the satisfactory quality for the spare path via the intermediate exchange transmitter/receiver 4 in service without line connection control and decides in advance whether the unconnected section may be applied to the spare in case.

As explained above, the transmission device with the performance monitor function comprises the system wherein the performance monitor is sequentially implemented for each transmitting/receiving station based on the route information included in the forward path performance monitor signal and the performance checking result is added to the backward path performance monitor signal. Therefore, the performance monitor is implemented regardless of whether the line connection section is actually connected via a line.

The example of the connection line between the start and end points is shown in this embodiment and it is clear that the same performance monitor is available in any section in the line including many connection devices.

Moreover, when the device which has been connected is included in the line section for which the performance monitor is implemented, the same performance monitor may evidently be executed. In addition, the evaluation by the error rate is provided here as an example of the performance monitor and the performance monitor may also be implemented for the evaluation of the loss in the transmission line with the OTDR.

As explained above, in the present invention, the performance monitor of the unconnected end-to-end line is implemented before the line is connected. Therefor, it is decided in advance whether the line is satisfactory for the service.

For example, when the quality of the communication in progress does not satisfy the required level and any line of the better quality is selected, the quality of the candidate unconnected line is measured and the lines are switched while the service is continuously provided. Moreover, when a terminal is continually communicating while switching lines with two or more terminals, the quality measurement is implemented for an unconnected terminal. As a result, the qualities of all the terminals are checked.

What is claimed is:

1. In a transmission system with a performance monitoring function and having transmission lines connecting an end office, an opposite office located opposite to said end office and an intermediate office located between said end office and said opposite office, the improvement wherein:

each of said end office, said opposite office and said intermediate office comprises;

transmitting/receiving means for transmitting/receiving information to/from an adjacent one of said offices, and performance monitoring means for implementing performance monitoring for the transmission line connecting two of said offices and to which said performance monitoring means is connected; and wherein said intermediate office further comprises, switching means for switching transmission lines connecting said intermediate office to adjacent ones of said offices, and bypass means for bypassing said switching means and for transmitting/receiving performance checking information for checking performance of a section of the transmission lines, the performance checking information being communicated between said performance monitoring means of said intermediate office and an adjacent one of said offices that is not connected by said switching means to said intermediate office while said performance monitoring means is operating, said bypass means being connected to said transmitting/receiving means of said intermediate office.

2. A monitor system for monitoring performance of transmission lines connecting an end office, an opposite office located opposite to said end office and an intermediate office located between said end office and said opposite office, and switching lines, wherein said end office comprises;

first forward path transmission means for inserting performance checking information for checking performance of a section of the transmission lines and forward route information indicating a route to be monitored into forward path transmission data and transmitting said forward path transmission data to said intermediate office as indicated by said forward route information; said extracted backward route information is directly supplied to said backward path transmission means;

and wherein said end office further comprises extract means for extracting said checking results of the transmission line sections from the received backward path transmission data.

3. The performance monitor system of claim 2, wherein said intermediate office checking means and said opposite office checking means comprise means for error-detecting.

4. The performance monitor system of claim 2, wherein said intermediate office checking means and said opposite office checking means comprise transmission line evaluation means for checking a loss in the transmission line connecting said intermediate and opposite offices.

5. The performance monitor means of claim 2, wherein said first and second forward path transmission means comprise operation means for generating an error-detecting code.

6. The performance monitor system of claim 2, wherein said forward path connection means connects said forward path extract means to said forward path transmission means when said forward path extract means detects the forward route information.

7. The performance monitor system of claim 2, wherein said backward path connection means connects said backward path extract means to said backward path transmission means when said backward path extract means detects said backward route information.

8. The performance monitor system of claim 2, further having a switch for connecting said opposite office checking means to said backward path transmission means and for supplying said checking result obtained by said opposite office checking means to said backward path transmission means.

9. A transmission apparatus with a performance checking function comprising:

plural transmission devices connected by transmission lines;

switching means for switching the transmission lines among said transmission devices;

checking information generation means for generating checking information for checking performance of a section of the transmission lines;

checking means for checking performance of the section of the transmission lines based on said checking information included in transmission data received from another one of said transmission devices;

forward path extract means for extracting forward route information for a route for the checking information included in said received transmission data;

forward path transmission means for inserting said extracted forward route information and newly generated checking information into the transmission data and transmitting said transmission data to a further one of said transmission devices as indicated by said forward route information;

forward path connection means for bypassing said switching means and for connecting said forward path extract means to said forward path transmission means so that said forward route information is directly supplied to said forward path transmission means;

backward path extract means for extracting backward route information indicating a one of said transmission devices to which a checking result from said checking means is to be transmitted and said checking results of the sections of the transmission lines from the transmission data sent from another one of said transmission devices;

backward path transmission means for inserting a checking result of the transmission line section obtained by said checking means and said extracted backward route information into backward path transmission data and transmitting said backward path transmission data to another one of said transmission devices indicated by said backward route information; and backward path connection means for bypassing said switching means and connecting said backward path extract means to said backward path transmission means so that said backward route information is directly supplied to said backward transmission means.

10. The transmission apparatus of claim 9, further comprising:

generation means for extracting forward route information from the transmission data sent from another one of said transmission devices and generating the backward route information based on said extracted forward route information; and transmission means for inserting the checking result from said checking means and said backward route information into the backward path transmission data and transmitting said backward path transmission data to another one of said transmission devices as indicated by said backward route information.

11. The transmission apparatus of claim 9, having:

generation means for generating said forward route information; and extract means for extracting the checking results from the received transmission data.

12. The transmission apparatus of claim 9, wherein said checking information generation means comprises means for error-detecting.

13. The transmission apparatus of claim 9, wherein said checking information generation means comprises transmission line evaluation means for checking a loss in the transmission line connecting two of said transmission devices.

14. The transmission apparatus of claim 9, wherein said forward path connection means comprises a switch for connecting said forward path extract means and said forward path transmission means when said forward path extract means detects the forward route information.

15. The transmission apparatus of claim 9, wherein said backward path connection means comprises a switch for connecting said backward path extract means and said backward path transmission means when said backward path extract means detects the backward route information.

16. The transmission apparatus of claim 9, further comprising a switch for connecting said checking means and said backward path transmission means and supplying the checking result to said backward path transmission means when the backward route information is detected.

17. A method for checking performance of transmission lines in a transmission system for connecting plural end offices via intermediate offices, said performance checking method comprising the steps of:

at a first end office:

generating forward route information from the first end office to a specified unconnected one of the end offices;

generating checking information for checking performance of the transmission line section connecting the first end office to the next one of the intermediate office indicated by said forward route information; and transmitting forward path transmission data including said forward route information and said checking information to said next one of the intermediate offices;

at the one of the intermediate offices which has received the forward transmission data:

checking a transmission line of said section based on said checking information;

extracting said forward route information from said forward path transmission data;

generating checking information for checking performance of a transmission line section connecting said next one intermediate office to a further one of the offices indicated by said forward route information; and transmitting the forward path transmission data including said generated checking information and said extracted forward route information to the further one of the offices indicated by said forward route information, at the further one of the end offices which has received the forward transmission data:

checking a transmission line of the transmission line section based on said checking information in said forward path transmission data;

extracting said forward route information from said forward path transmission data;

generating backward route information indicating a route path reverse to a route indicated by said extracted route information; and transmitting backward path transmission data including said checking result and said backward route information to a one of the intermediate offices indicated by said backward route information;

at the intermediate office which has received the backward transmission data;

extracting said backward route information and the checking results from said backward path transmission data;

generating the backward path transmission data including said extracted backward route information, and the checking results; and transmitting said backward path transmission data to a further one of the offices as indicated by said backward route information, and at the end office which has received said backward path transmission data, extracting the checking results of the transmission line sections from said backward path transmission data.

18. The performance check method for a transmission line of claim 17, wherein said checking information is error rate detecting information.

19. The performance check method for a transmission line of claim 17, wherein said checking information is transmission line evaluation information for checking a loss in the transmission line connecting two of the offices.

* * * * *